US011436752B1

(12) United States Patent
Rublee

(10) Patent No.: US 11,436,752 B1
(45) Date of Patent: Sep. 6, 2022

(54) REAL TIME LOCALIZATION WITH IMAGE DATA

(71) Applicant: farm-ng Inc., Watsonville, CA (US)

(72) Inventor: Ethan Rublee, Watsonville, CA (US)

(73) Assignee: farm-ng Inc., Watsonville, CA (US)

( * ) Notice: Subject to any disclaimer, the term of this patent is extended or adjusted under 35 U.S.C. 154(b) by 0 days.

(21) Appl. No.: 17/733,871

(22) Filed: Apr. 29, 2022

Related U.S. Application Data

(60) Provisional application No. 63/182,714, filed on Apr. 30, 2021.

(51) Int. Cl.
  *G06K 9/00* (2022.01)
  *G06T 7/70* (2017.01)
  *G06T 9/00* (2006.01)

(52) U.S. Cl.
  CPC .............. *G06T 7/70* (2017.01); *G06T 9/00* (2013.01); *G06T 2207/20081* (2013.01); *G06T 2207/20084* (2013.01)

(58) Field of Classification Search
  CPC ..................................................... G06T 7/70
  See application file for complete search history.

(56) References Cited

U.S. PATENT DOCUMENTS

| | | | |
|---|---|---|---|
| 9,454,244 B2 * | 9/2016 | Wilson | G06F 3/038 |
| 9,875,427 B2 | 1/2018 | Medasani et al. | |
| 10,089,330 B2 * | 10/2018 | Gao | G06F 16/35 |
| 10,726,264 B2 * | 7/2020 | Sawhney | G06V 20/64 |
| 10,909,715 B1 | 2/2021 | Boggs et al. | |
| 11,003,956 B2 | 5/2021 | Weinzaepfel et al. | |
| 11,007,015 B2 | 5/2021 | Vaughan et al. | |
| 11,069,081 B1 | 7/2021 | Sturm | |
| 2018/0285697 A1 * | 10/2018 | Shotton | G06V 20/20 |

(Continued)

FOREIGN PATENT DOCUMENTS

| | | |
|---|---|---|
| EP | 2048599 B1 | 12/2009 |
| EP | 3882856 A1 | 9/2021 |

(Continued)

OTHER PUBLICATIONS

"Real Time pose estimation of a textured object", OpenCV, accessed on Apr. 11, 2022, 11 pages.

(Continued)

*Primary Examiner* — Hadi Akhavannik
(74) *Attorney, Agent, or Firm* — Daylight Law, P.C.

(57) ABSTRACT

Methods and systems for real time localization of a device using image data are disclosed herein. A disclosed method for localizing a device with respect to a known object includes capturing an image of at least a portion of the known object. The method also includes determining, using a trained machine intelligence system and the image, a set of known object coordinates for a set of known object pixels of the image. The set of known object coordinates: are outputs of the trained machine intelligence system; are in a frame of reference of the object; and encode each object coordinate in the set of known object coordinates using an encoding with at least two values per object coordinate. The method also includes localizing the device with respect to the known object using the set of known object coordinates from the trained machine intelligence system.

30 Claims, 6 Drawing Sheets

(56) References Cited

U.S. PATENT DOCUMENTS

| | | |
|---|---|---|
| 2019/0278983 A1 | 9/2019 | Iqbal et al. |
| 2020/0029488 A1* | 1/2020 | Bertucci ............... G06K 9/623 |
| 2020/0134866 A1 | 4/2020 | Kitaura et al. |
| 2020/0300624 A1 | 9/2020 | Voth et al. |
| 2021/0004983 A1 | 1/2021 | Fischer et al. |
| 2021/0048540 A1 | 2/2021 | Miller et al. |
| 2021/0090328 A1* | 3/2021 | Laddha ............... G06N 3/0454 |
| 2021/0118166 A1 | 4/2021 | Tremblay et al. |
| 2021/0125366 A1 | 4/2021 | Hasberg et al. |
| 2021/0158561 A1 | 5/2021 | Park et al. |
| 2021/0241521 A1* | 8/2021 | Zhe ....................... G06V 40/16 |
| 2021/0308869 A1 | 10/2021 | Tang et al. |
| 2021/0319709 A1 | 10/2021 | Rose et al. |
| 2021/0327084 A1 | 10/2021 | Ivanov |

FOREIGN PATENT DOCUMENTS

| | | |
|---|---|---|
| WO | 2021164887 A1 | 8/2021 |
| WO | 2021167586 A1 | 8/2021 |
| WO | 2021198666 A1 | 10/2021 |

OTHER PUBLICATIONS

A. Nigam, et al., "Detect Globally, Label Locally: Learning Accurate 6-DOF Object Pose Estimation by Joint Segmentation and Coordinate Regression", IEEE Robotics and Automation Letters, vol. 3, No. 4, Oct. 2018, 8 pages.

C. Yu, et al., "BiSeNet: Bilateral Segmentation Network for Real-time Semantic Segmentation", National Key Laboratory of Science and Technology on Multispectral Information Processing, School of Automation, Huazhong, University of Science & Technology, China, Key Laboratory of Machine Perception, Peking University, China, arXiv:1808.00897v1 [cs.CV], Aug. 2, 2018, 17 pages.

K.Park, "Pix2Pose: Pixel-Wise Coordinate Regression of Objects for 6D Pose Estimation", Vision for Robotics Laboratory, Automation and Control Institute, TU Wien, Austria, arXiv:1908.07433v1 [cs.CV], Aug. 20, 2019, 17 pages.

O. Ronneberger, et al., "U-Net: Convolutional Networks for Biomedical Image Segmentation", Computer Science Department and BIOSS Centre for Biological Signalling Studies, University of Freiburg, Germany, May 18, 2015, arXiv:1505.04597v1 [cs.CV], 8 pages.

R. Guler, et al., DensReg: "Fully Convolutional Dense Shape Regression In-the-Wild", INRIA-CentraleSupelec, France, Imperial College London, UK, University College London, UK, Jun. 19, 2017, arXiv:1612.01202v2 [cs.CV], code and supplementary materials available at: http://alpguler.com/DenseReg.html, 11 pages.

S. Minaee, et al., "Image Segmentation Using Deep Learning: A Survey", arXiv:2001.05566v5 [cs.CV], Nov. 15, 2020, 22 pages.

Z. Fan, et al, "Deep Learning on Monocular Object Pose Detection and Tracking: A Comprehensive Overview", Journal of LaTeX Class Files, vol. 14, No. 8, Aug. 2015, 24 pages.

\* cited by examiner

REAL TIME LOCALIZATION WITH IMAGE DATA

CROSS REFERENCE TO RELATED APPLICATIONS

This application claims the benefit of U.S. Prov. Pat. App. No. 63/182,714, filed on Apr. 30, 2021, which is incorporated by reference herein in its entirety for all purposes.

BACKGROUND

Pose estimation tasks can involve determining the pose of an object from an image of the object. The output of a pose estimation task conducted with respect to three-dimensional space is a six degree of freedom (6-DOF) output comprising the position of the object in terms of x-, y-, and z-coordinates as well as the rotation of the object in terms of the pitch, yaw, and roll of the object. Pose estimation is an important task in the field of machine vision and has been the subject of intense research. Recent approaches to determine the pose of an object from an image of the object have utilized trained machine intelligence systems to conduct at least a portion of the pose estimation pipeline. However, many of these systems have significant limitations such as in their limited accuracy and large computational resources requirements. Pose estimation using trained machine intelligence systems remain an active area of research and one that presents a promising field for future innovation.

SUMMARY

Methods and systems for real time localization of a device using image data are disclosed herein. The methods and systems can include trained machine intelligence systems that have been trained to determine the pose of a known object from an image of at least a portion of the known object. The image can be captured from the perspective of the device using a sensor attached to the device. As such, the trained machine intelligence systems can be used as part of a localization pipeline to localize the device with respect to the known object. The localization pipeline can include a trained machine intelligence system to determine a pose of the known object and a perspective and point (pnp) solver to localize the device based on the image and the detected pose of the known object within the image. The object is referred to as being "known" because the characteristics of the object were available to the system ex ante (e.g., the trained machine intelligence system was trained using actual or simulated images of the object).

In specific embodiments of the invention disclosed herein, various techniques are applied to enable real time localization of a device with respect to a known object. As such, the localization of the device can be applied to control navigation of the device in the vicinity of the object. One application is for controlling docking, landing, or rendezvous maneuvers in space (e.g., the object could be a landing site on the lunar surface and the device could be a space faring vehicle intended for the landing site). Such applications provide significant benefits in that the moon, and space in general beyond geosynchronous orbit, does not currently have a positioning system such as the global positioning system (GPS) to assist in guidance and navigation. Additional applications include high accuracy vehicle positioning within a region of interest for refueling airborne aircraft (e.g., the device is the aircraft and the object is the fuel source), computer game applications with augmented or virtual reality, medical applications (e.g., the known object is a tumor or organ and the device could be an image-guided surgical robot system), robotic manipulators (e.g., the known object could be a storage structure and the device could be a warehouse robot), industrial inspection applications (e.g., the known object could be an oil pipeline and the device could be an underwater repair or inspection robot), agricultural applications (e.g., the known object could be a row of crops in a field and the device could be a tractor), and many others. Indeed, any application in which alternative navigation systems such as GPS are not available, do not provide sufficient accuracy, or are otherwise not feasible, but a machine intelligence system can be trained with images of a known object, and can recognize significant benefits when applying the various techniques disclosed herein.

In specific embodiments of the invention, a trained machine intelligence system is designed to output encoded known object pixel coordinates for a set of known object pixels in an input image. The known object pixel coordinates for a given pixel are coordinates, in a frame of reference of the object, corresponding to a location of the portion of the known object which can be seen in that given pixel. The encoding of the object coordinates can include at least two values per object coordinate. In specific embodiments of the invention, the values in the at least two values can be independently regressed during the training of the trained machine intelligence system. In specific embodiments of the invention, the values in the at least two values can be separate and independent inputs to a loss function which is used to train the machine intelligence system. The encoded known object pixel coordinates can serve as intermediate training outputs of the trained machine intelligence system, or final outputs of the trained machine intelligence system. The inventors have determined that a trained machine intelligence system that is trained in this manner and that includes this type of training output expresses superior performance both in terms of accuracy of inference, speed of training, and speed of inference generation as compared to approaches that use trained machine intelligence system which only output and regress unencoded single value known object pixel coordinates.

In specific embodiments of the invention, a method for localizing a device with respect to a known object is provided. The method includes capturing, using a sensor attached to the device, an image of at least a portion of the known object. The image includes a set of pixels. The method also includes determining, using the image, a set of known object pixels from the set of pixels. The known object occupies the set of known object pixels in the image. The method also includes determining, using a trained machine intelligence system and the image, a set of known object coordinates for the set of known object pixels. The set of known object coordinates are in a frame of reference of the object, and encode each object coordinate in the set of known object coordinates using an encoding with at least two values per object coordinate. The method also includes determining at least one of a location and an orientation of the device with respect to the known object using the set of known object coordinates from the trained machine intelligence system.

DETAILED DESCRIPTION

Methods and systems for real time localization of a device using image data in accordance with the summary above are disclosed in detail herein. The methods and systems disclosed in this section are nonlimiting embodiments of the invention, are provided for explanatory purposes only, and should not be used to constrict the full scope of the invention. As stated in the summary above, systems in accordance with specific embodiments of the invention disclosed herein can include a localization pipeline that takes in an image of a known object and outputs at least one of a location and an orientation of a device with respect to the known object. The localization pipeline can include a trained machine intelligence system with various characteristics that depend upon the application the localization pipeline is being applied to and the additional systems in the pipeline.

The trained machine intelligence system can be an artificial neural network (ANN), support vector machine, or any type of functional approximator or equivalent algorithmic system that can be iteratively adjusted using image data of the known object. The image data used to train the trained machine intelligence system can include real images captured of the known object or simulated images of the known object. The training can involve supervised learning using labeled image data or unsupervised learning. In the case of an ANN, multiple forms of ANNs can be utilized including convolutional neural networks, adversarial networks, attention networks, recursive neural networks (RNNs), and various others. The ANN can include multiple layers such as convolutional layers, fully connected layers, pooling layers, up sampling layers, dropout layers, and other layers. The ANN can include one or more encoders and one or more decoders. The ANN can be feed forward only or include recursive pathways such as in the case of an RNN. The trained machine intelligence system can be trained using one or more of a linear regression, support vector regression, random forest, decision tree, or k-nearest neighbor analysis.

Figure 1:
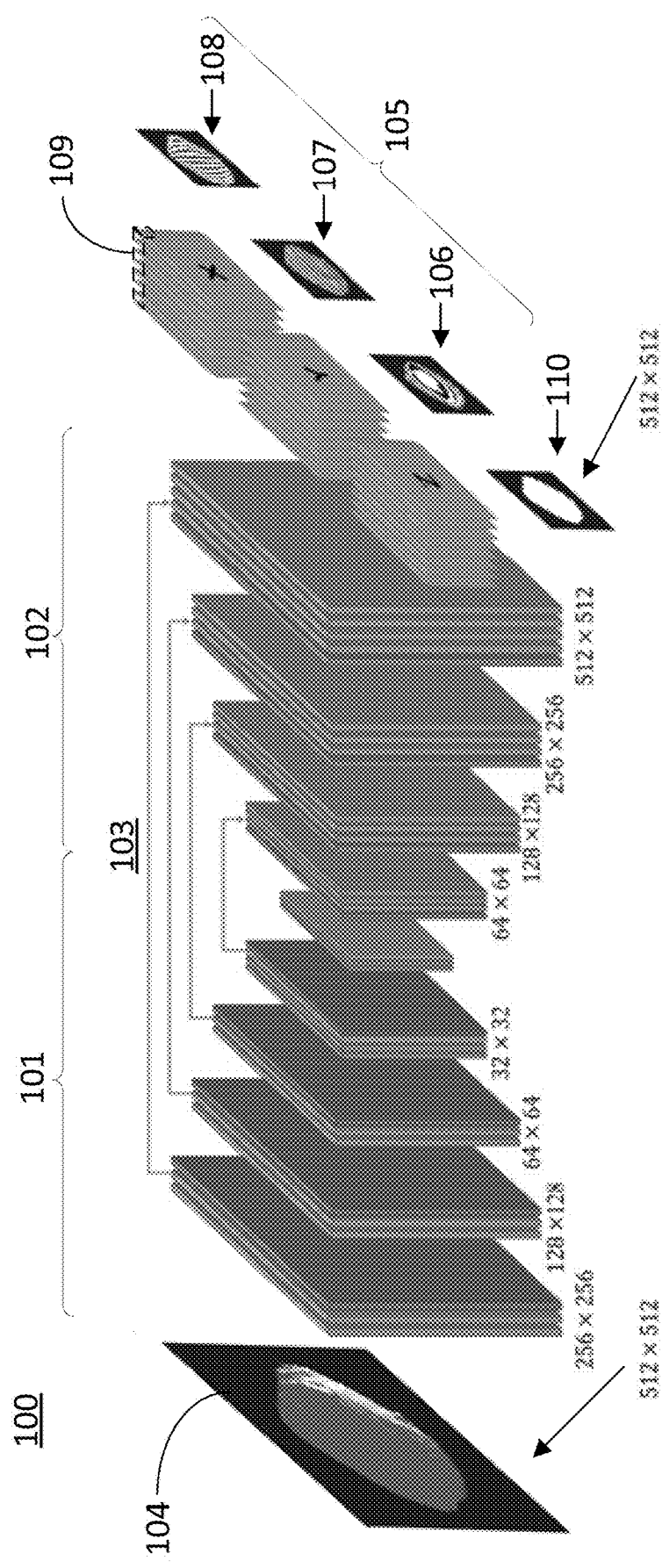
FIG. 1 illustrates a block diagram of a trained machine intelligence system that is in accordance with specific embodiments of the invention disclosed herein.

FIG. 1 illustrates a block diagram of a trained machine intelligence system 100 that is in accordance with specific embodiments of the invention disclosed herein. In the example of FIG. 1, the trained machine intelligence system is a convolutional neural network with a set of layers comprising an encoder 101 and a set of layers comprising a decoder 102. This is a common structure in the field of CNNs for image processing with the encoder converting the information from the image space to information in a feature space and the decoder converting the information in the feature space back into information in the image space. The CNN includes multiple kinds of layers including convolutional layers, up-sampling layers, pooling layers, and drop out layers. The CNN can be a deep convolutional network such as U-Net. Layers in the encoder and decoder are linked by concatenate operations 103. The intermediate layers of the trained machine intelligence system 100 include filters with values that are used in the convolutional layers and which are adjusted during training in order for the network to learn the characteristics of the known object. In this manner aspects of the known object and any variances in the training data are incorporated into the trained machine intelligence system during training.

The trained machine intelligence system can have various inputs depending upon where it is in the localization pipeline and what its role will be. In general, the trained machine intelligence system will be used with the image to generate known object coordinates for at least a subset of the pixels in the image. However, the image may be preprocessed by other systems before it is delivered to the trained machine intelligence system. The input to the trained machine intelligence system can be an image of at least a portion of the known object or processed image data of the known object. The image can be captured using a sensor attached to the device that is being localized with respect to the object. The image can include a set of pixels each having one or more pixel values (e.g., a greyscale integer value or multiple values for encoding a color scheme such as an RGB encoding). As used herein, regardless of whether raw image data is input directly to the trained machine intelligence system or if the image data is first processed by an earlier stage of the localization pipeline before being provided as an input to the trained machine intelligence system, the trained machine intelligence system will still be described as being used with the image to determine object coordinates for the pixels in the image.

The input to the trained machine intelligence system can include one or more images. For example, the trained machine intelligence system can be designed to generate a single inference from a single image. However, the trained machine intelligence system can also receive multiple images that are taken at the same time or at different times. The input can therefore be stereo images of the object with any number of images taken from any number of sensors on the device. In the alternative or in combination, the input can include a timeseries of images of the object taken as the device moves with respect to the object.

The input to the trained machine intelligence system and the image can have various encodings. For example, the image can comprise a set of pixel data in the form of single value grayscale or color codes per pixel in the image. As another example, the image can comprise multiple sets of pixel data in the form of RGB values per pixel in the image. As another example, the images can be encoded in the form of a set of three-dimensional voxel values where the values are a single value or multiple values.

In different implementations, the input and image can have various dimensionalities. The image can be a 1, 2, 2.5, or 3-dimensional image of a known object, and the input to the network can have the same or different dimensionality as the image. For example, the pixel data of a two-dimensional image can be provided to the network in one or more two-dimensional matrices of pixel values, or the voxel data of a three-dimensional image can be pre-processed and provided to the network in one or more two-dimensional matrices of pixel values. In the case of two-dimensional inputs and images the input to the trained machine intelligence system can have the same width and length as the image, or different widths and lengths.

The input to the trained machine intelligence system can include additional data that is used in combination with the image data. For example, the input can involve metadata regarding the image such as a time at which the image was taken, the weather at the time the image was taken, an ambient light condition at the time the image was taken, or other metadata. As another example, the input can involve additional sensor data acquired with the image data by additional sensors such as depth data of the object, radar data, stereo image data of the object, odometry data, inertial movement unit data, gravimetric data, image data from multiple electromagnetic spectra (e.g., SWIR, IR, UV, visible light, etc.), and others. The additional sensor data can be collected by additional sensors on the device.

The image can be of at least a portion of the known object and can in the alternative or in combination include occluded portions of the known object. One of the significant benefits of specific embodiments of the present invention includes the fact that the known object does not need to be centered in the image and/or processed with a particular level of zoom before being provided to the trained machine intelligence system. Instead, images of the known object from various distances and with various translations and rotations from the center of the image can be input to the trained machine intelligence system. Another significant benefit of specific embodiments of the present application includes the fact that only a portion of the object needs to be in the image. For example, if the object is occluded by another object, is covered by a shadow, or is outside the frame of the image, the trained machine intelligence system can still provide known object coordinates for pixels where the known object is located, or where the known object would otherwise be located if it were not occluded. While preprocessing (e.g., a bounding box, object detection, image processing variance cancellation, etc.) can, as described above, be applied to remove these variances from the image before it is provided to the trained machine intelligence system, benefits accrue in terms of reduced computational resource consumption and time for inference if the images can be directly provided to the network without such preprocessing. This benefit can be realized by training specific trained machine intelligence systems disclosed herein using images of the object with various variances added, and by using the coordinate encodings described herein.

In the example of FIG. 1, the image 104 is a greyscale image of a known object in the form of an asteroid with a width of 512 pixels and a length of 512 pixels. The input to the trained machine intelligence system 100 is therefore a set of 512×512 pixel values in the form of greyscale numerical values corresponding to each pixel in the image. The first layer of encoder 101 will conduct a set of mathematical operations with these greyscale numerical values in the form of many convolutions of the filters that define the first layer of the encoder 101 with the greyscale numerical values of image 104.

The trained machine intelligence system can have various outputs depending upon where it is in the localization pipeline and what its role will be. In general, the trained machine intelligence system can assist in the determination of a set of known object coordinates for a set of known object pixels in an image of an object. As described in the summary, the known object pixel coordinates for a given pixel are coordinates, in a frame of reference of the object, corresponding to a location of the portion of the known object which can be seen in that given pixel. The known object pixel coordinates can be represented by binary, integer, or floating-point numbers that represent the coordinates. The trained machine intelligence system can output the set of known object pixels in a frame of reference of the object. The frame of reference can have various formats such as a cartesian x-y-z coordinate system, a spherical coordinate system, or other coordinate systems. The coordinate system for the frame of reference can also have various dimensions in different embodiments such as a three-dimensional x-y-z coordinate system or a two-dimensional x-y coordinate system (e.g., for a planar object or painting).

In specific embodiments of the invention, the trained machine intelligence system can output the set of known object pixels in an encoding which includes at least two values per coordinate. In alternative embodiments of the invention, the trained machine intelligence system can output the set of known object pixels in an encoding which includes at least two values for one coordinate, and one value for the other coordinates. As used herein, an output of a machine intelligence system is one or more values that are generated by the machine intelligence system in response to an application of an input to the machine intelligence system and which can be used directly by later stages of a localization pipeline, to which the trained machine intelligence system is a part, or that can be used as training outputs which are regressed during training of the trained machine intelligence system such as by being used in a loss function of the training algorithm for the trained machine intelligence system. In situations in which the known object coordinates are output in an encoding, a separate decoder can decode the encoding as described with reference to FIG. 6 below. In specific embodiments of the invention, the decoder can also be a trained machine intelligence system. In these embodiments, both the decoder and the machine intelligence system that outputs the encoded known object coordinates can be trained simultaneously or separately. In the case of simultaneous training, both the decoded known object coordinates and the encoded known object coordinates can contribute to the loss function used to guide the training of the decoder and the machine intelligence system.

The known object coordinates can be in a frame of reference of the object. The reference frame can correspond to a canonical orientation of the object and a canonical origin point of the object. The frame of reference can be a cartesian coordinate system with an origin at the center of gravity or center of volume of the object (e.g., center of gravity of an industrial part, center of gravity of a vehicle, a medium point in the landmark location, a particular point on or in a space faring vessel, the center of the moon, etc.) and aligned with a specific rotation of the object. However, alternatively positioned reference frames are possible. The frame of reference does not need to be centered on the object so long as the object is registered in the frame of reference. For example, the frame of reference can be an Earth centered frame of reference, a ground centered frame of reference, or any other frame of reference in which the object is registered. The frame of reference can have various dimensions depending upon the application. For example, the known object coordinates could be encoded as Cartesian distances from the center of a row, road, hallway, walkway, or path that the device is traveling with the frame of reference being a one-dimensional frame of reference.

The encoding of the known object coordinates can take on various forms. In general, the encoding can include at least two values per known object coordinate. The at least two values can be part of a standard binary encoding, a Gray code encoding, a polynomial encoding, a sinusoidal encoding, a Fourier transform encoding, and other encodings and combinations thereof. The encoding could be any basis function using the known object coordinates as inputs such as a Fourier basis function, a Laplace basis function, a trigonometric basis function such as a Sine basis function, and various others. A specific example of encoding a known object coordinate in the form of a floating-point number for an x-coordinate into a two value fixed point binary encoding is provided as follows. The encoding function could involve first normalizing a known object coordinate from a floating point number to a fixed point value $(2^N-1)*(x-max\_z)/(max\_x-min\_x)$ that fits into the number "N" of values we are encoding it with. The function could continue with taking the binary representation of this fixed width number as the values for the encoding. So, if we have an x-coordinate value "X" between 0 and 1 (already normalized for simplicity), and we have N=2 values in the encoding, then we multiply $X*(2^N-1)$, or floor $(X*3)$. So, the values in the encoding for X=1 will be (1.0, 1.0), X=0 will be (0.0, 0.0) and X=0.5 will be (0.0, 1.0).

Regardless of the function used to produce the encoding, the encoding could include separately trainable values for each of the known object coordinates. For example, in the encoding example provided in the prior paragraph, an x-coordinate of "1" could be encoded as the two separately trainable values "1" and "1" such that a difference between those two values and a training output could be inputs to a loss function for training the trained machine intelligence system. As another example, an x-coordinate of "3" could be encoded as the standard binary encoding 11 where each of the two values "1" and "1" in this encoding were separably trainable values in the machine intelligence system. As another example, an x-coordinate 148 could be encoded in the polynomial space $x^2+y$ where x was 12 and y was 4 where both the x and y values were separately trainable values in the machine intelligence system.

The size of the encoding can take on various forms. In specific embodiments of the invention, the encoding could include a set of values for each pixel in the original image. In the alternative, the encoding could include a set of values for each pixel in a subset of pixels from the original image. For example, only for those pixels in which the object was identified as occupying the pixel. In specific embodiments of the invention, the encoding will include multiple sets of values where each value in the set of values represents a pixel in the set of pixels, or a subset of pixels in the set of pixels. The resolution of the encoding could be increased by increasing the number of sets of values. The size of the encoding relative to the original image could be increased or decreased by altering the number of values in each such set.

The values in the encoding can take on various forms including having each value in the encoding be an integer number, a binary number, a floating-point number (e.g., single, double, or decimal precision) etc. The values can also be represented in the localization pipeline using different levels of precision such as 8-bit integer, 16-bit integer, 16-bit floating point, etc. The type of number used for each value will of course depend on the type of encoding used. In situations in which the encoding is a binary encoding, the individual values would be binary. In situations in which the encoding is a sinusoidal encoding, the individual values could be decimal numbers from 0 to 1.

The encoding can also be represented in various ways by the trained machine intelligence system. For example, the trained machine intelligence system could store the values of the encoding in a set of channels. Each set of channels could be used to represent the encoding of a given coordinate for all the known object coordinates being represented by the encoding (e.g., a first set of channels for the x-coordinates and a second set of channels for the y-coordinates). Each channel in the set of channels can include a set of values and have the same dimensions as the set of pixels from the input image. Alternatively, each channel can have fewer values depending upon how many pixels from the image are being represented by the encoding. The at least two values per known object coordinate could be from different channels in the set of channels. As mentioned above, the encoding can include different degrees of resolution by increasing the number of values representing each coordinate which would require an increase in the number of channels representing each coordinate of the known object coordinates (e.g., increasing a number of channels from 5 to 8 for the x-coordinate of an encoding would increase the resolution per coordinate from 5 to 8 bits).

In the example of FIG. 1, the output of trained machine intelligence system 100 includes an encoding 105 of the known object coordinates where each object coordinate in the set of known object coordinates is encoded with at least two values per object coordinate. The encoding 105 includes three sets of channels 106, 107, and 108. Each set of channel includes eight channels which are each matrices that have the same dimensions as the set of pixels that comprise image 104 (e.g., they are all 512×512 matrices of values). As such, each channel stores one value of one coordinate for each pixel in the input image. Each set of channels includes a set of known object coordinate values per pixel. As illustrated, set of values 109 are the values for the x-coordinate of the top right pixel of the image stored across the eight channels that comprise set of channels 108. All these outputs can be provided to a decoder that decodes the values into a set of single value x-, y-, and z-coordinates for each pixel. However, each value in the various channels can also be separately used as a training output for training trained machine intelligence system 100 and can be separately regressed. The inventors have found that this approach provides faster convergence and superior accuracy and performance as compared to approaches which train only on single value coordinates for the known object coordinates.

The trained machine intelligence system can determine which pixels in an input image correspond to the known object and output information regarding that determination in addition to the known object coordinates. In specific embodiments of the invention, a separate system in the localization pipeline will preprocess the image to determine which portions of the image correspond to the known object. This separate system could then segment the object from the image and provide only the known object pixels to the trained machine intelligence system. However, in alternative embodiments, the trained machine intelligence system can also determine which portions of the image are known object pixels and which are not (e.g., the same trained machine intelligence system can output known object coordinates for known object pixels in an input image and output null or zero values for pixels in the image that are not associated with the known object). Additionally, or in combination, the same trained machine intelligence system, or a separate system, can output a probability of visibility map for the input image.

The trained machine intelligence system of FIG. 1 does a combination of the two approaches mentioned in the preceding paragraph. In the example, of FIG. 1, the encoding output 105 includes null values for portions of the image that are not associated with the object from image 104. Additionally, the trained machine intelligence system outputs a probability of visibility map 110 which is a binary mask with "1" values indicating pixels associated with visible portions of the object and "0" values indicating pixels that do not contain visible portions of the object.

In specific embodiments of the invention in which a probability of visibility map is generated, the map can take on various forms. The system can generate separate maps to represent different categories of pixels or encoded different categories of pixels in a single map. The one or more maps can distinguish pixels associated with a portion of the known object where the known object is visible in the image (visible pixels), pixels associated with a portion of the known object where the known object is occluded in the image (occluded pixels), and pixels where the known object is not present (out of boundary pixels). The one or more maps can collapse the occluded pixels in with the visible pixels or with the out of boundary pixels depending upon the application. The one or more maps can include binary values indicating whether a pixel belongs to one category or another (e.g., a "1" indicates a portion of the object while a "0" represents a pixel that is not a portion of the object). The map can alternatively or in combination include normalized values between 0 to 1 representing probabilities that a given pixel corresponds with a given category or not. If the map includes normalized values between 0 to 1 representing probabilities, the ground truth for these probabilities will be either "0" (pixel not part of the known object) or "1" (pixel part of the known object) for the purpose of training the machine learning model.

In specific embodiments of the invention in which a probability of visibility map is generated, the map can be used for various purposes. The map can be output by the trained machine intelligence system, or provided by a separate system, and then be used to simplify training or later stages of the localization pipeline. For example, the probability of visibility map can be used to suppress training by forcing the loss function for a trained machine intelligence system to ignore differences between a predicted known object coordinate and a ground truth known object coordinate for portions of the image that do not contain the object and/or that contain an occluded portion of the object. In particular, the probability of visibility map can be used during the training of the trained machine intelligence system by computing a loss component related to the known object coordinates only where the known object is deemed visible according to the probability of visibility map (e.g., the value for that known object coordinate's pixel is higher than a threshold). As another example, the probability of visibility map can be used by a downstream system to determine the confidence with which it should consider a known object coordinate when attempting to solve for the pose of the object or localization of the device.

In specific embodiments of the invention where the encoding is a standard binary or Gray code encoding, the encoding for training data can be smoothed to improve the performance of the machine intelligence system. This smoothing can be done by Gaussian blurring for example, but many other methods are possible such as training another trained machine intelligence system to smooth the codes while maintaining the performance of the machine intelligence system. Trained machine intelligence networks often learn better with smoothed inputs. This is because the harsh 0-1 boundary of edge regions is inherently unstable and uncertain and so should be smoothed to reflect this.

In specific embodiments of the invention, the set of known object coordinates can include coordinates for portions of the object that are occluded in the image. For example, at least one of the known object coordinates in the set of known object coordinates output by the trained machine intelligence system could correspond with an occluded portion of the known object in the image but a known object coordinate could still be provided for the corresponding pixel in the image. For example, if the object were the lunar surface, a shadow, dust cloud, or other obfuscating medium could cover portions of the object in the image, but the trained machine intelligence system would still generate object coordinates for the occluded portions. The trained machine intelligence system can indeed be trained with images in which portions of the object are intentionally occluded via simulation or in actual images of the object in order to make the system include this capability. As such, in specific embodiments at least one of the known object coordinates in the set of known object coordinates determined by the trained machine intelligence system will correspond with an occluded portion of the known object in the image.

In embodiments in which the trained machine intelligence system or an alternative system generates a probability of visibility map, the probability of visibility map can encode occluded portions of the object the same or differently than portions of the image which are outside the bounds of the object. The simplification of training or later stages of the localization pipeline can then treat occluded portions and portions outside the bounds of the object differently based on the encoding in the probability of visibility map. For example, occluded portions could still be considered for training to train the trained machine intelligence system to predict object coordinates accurately in images in which the object is occluded, but the prediction of known object coordinates for occluded portions could be ignored at runtime in order to avoid potential inaccuracies impacting the pose determination for the object or the localization determination for the device. In the same example, the portions of the image that are entirely outside the bounds of the object according to the probability of visibility map could be ignored entirely to simplify both training and later stages of the localization pipeline.

As stated previously, in specific embodiments of the invention, the known object coordinates which are output by the trained machine intelligence system can be encoded using Gray codes such that the encoding is a Gray code encoding. Generic binary numerical codes change rapidly between bits. For example, decimal number 1 is 01 in standard binary code and decimal number 2 is 10 in standard binary code. Note that 2 bits are changed for the codes in just one decimal number of difference. Instead, the known object coordinates can be encoded with Gray codes that have a lower rate of change between adjacent values. For example, the Gray code for decimal number "1" is 01, and the Gray code for decimal number "2" is 11. As seen, only one bit changes at a time. Known object coordinates, encoded using Gray codes, can be used to train the trained machine intelligence system. In specific implementations, Gray code encodings for bit code maps can be learned better because the patterns on the map are more clustered and connected and therefore there may be fewer isolated bits which can be misinterpreted as noise. Gray codes also allow for easier error correction for example by using Hamming error correction extra code bits if desired.

Figure 2:
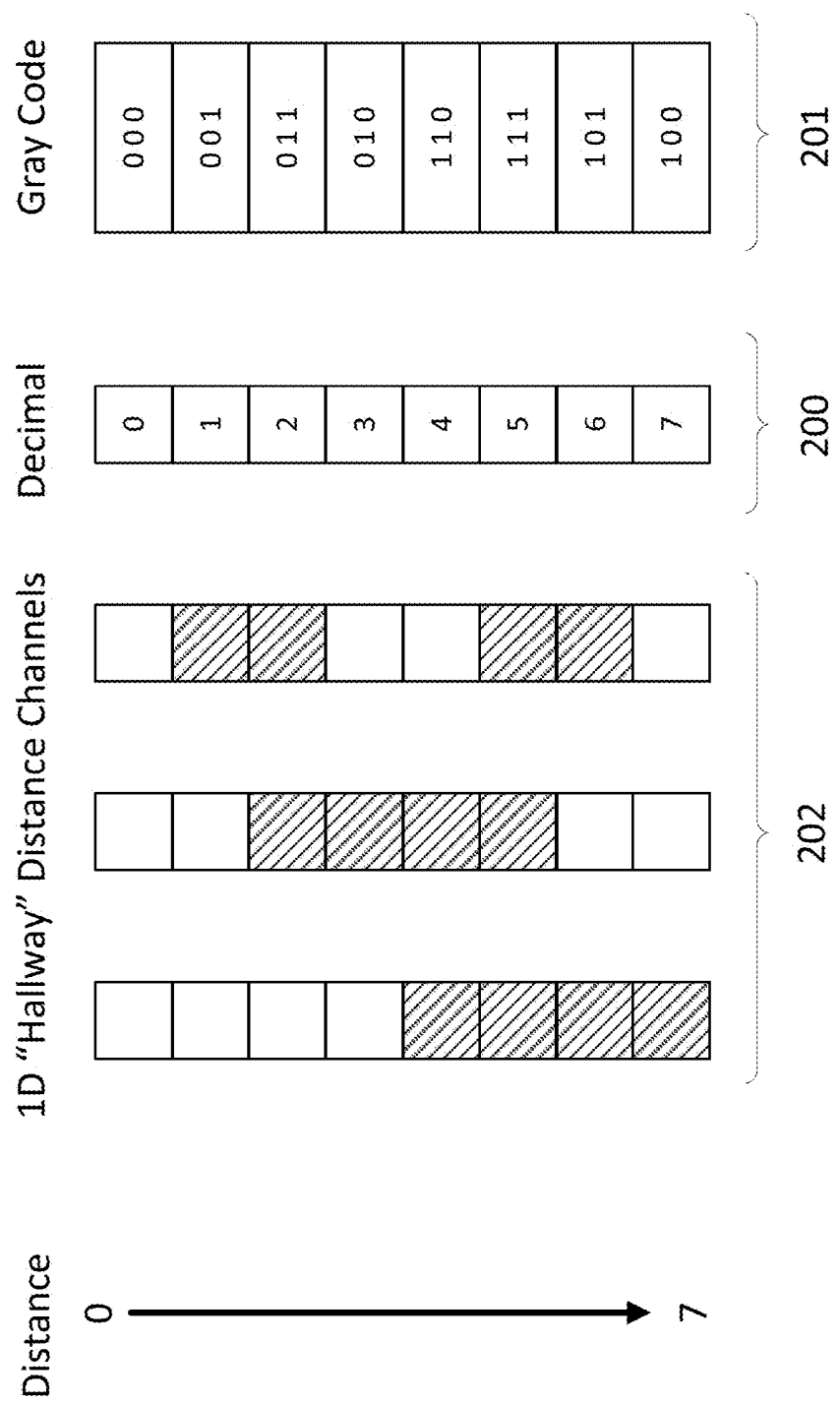
FIG. 2 illustrates an example of an encoding of a set of known object pixel coordinates in a one-dimensional frame of reference in accordance with specific embodiments of the invention disclosed herein.

FIG. 2 illustrates an example of an encoding of a set of known object pixel coordinates in a one-dimensional frame of reference in accordance with specific embodiments of the invention disclosed herein. The frame of reference in this example is a one-dimensional axis (e.g., to represent a position along a hallway) and the known object coordinates can be distance values along the axis from an origin point. The decimal values are provided in list 200 and are arranged next to a list 201 of their associated Gray codes. Three values are provided in this encoding for ease of drawing but larger value encodings (e.g., 8-bit, 16-bit, etc.) could be provided instead. In the illustrated embodiment, the trained machine intelligence system represents each coordinate from the known object coordinates with a set of three channels as shown in list 202. Since this is a one-dimensional case the known object coordinates include only a single coordinate. In this simple case the three channels include separate binary values that encode the distance coordinate. Each column of list 202 represents a single output value of the single known object coordinate in this example. The example is provided to illustrate how the signature of each individual channel is relatively smooth with an emphasis on minimizing the number of transitions. Furthermore, each set of values differs by a small amount such that the space into which the outputs are being regressed is relatively smooth. As such, this example shows how Gray codes can result in a more accurate and easier to train trained machine intelligence system.

Figure 3:
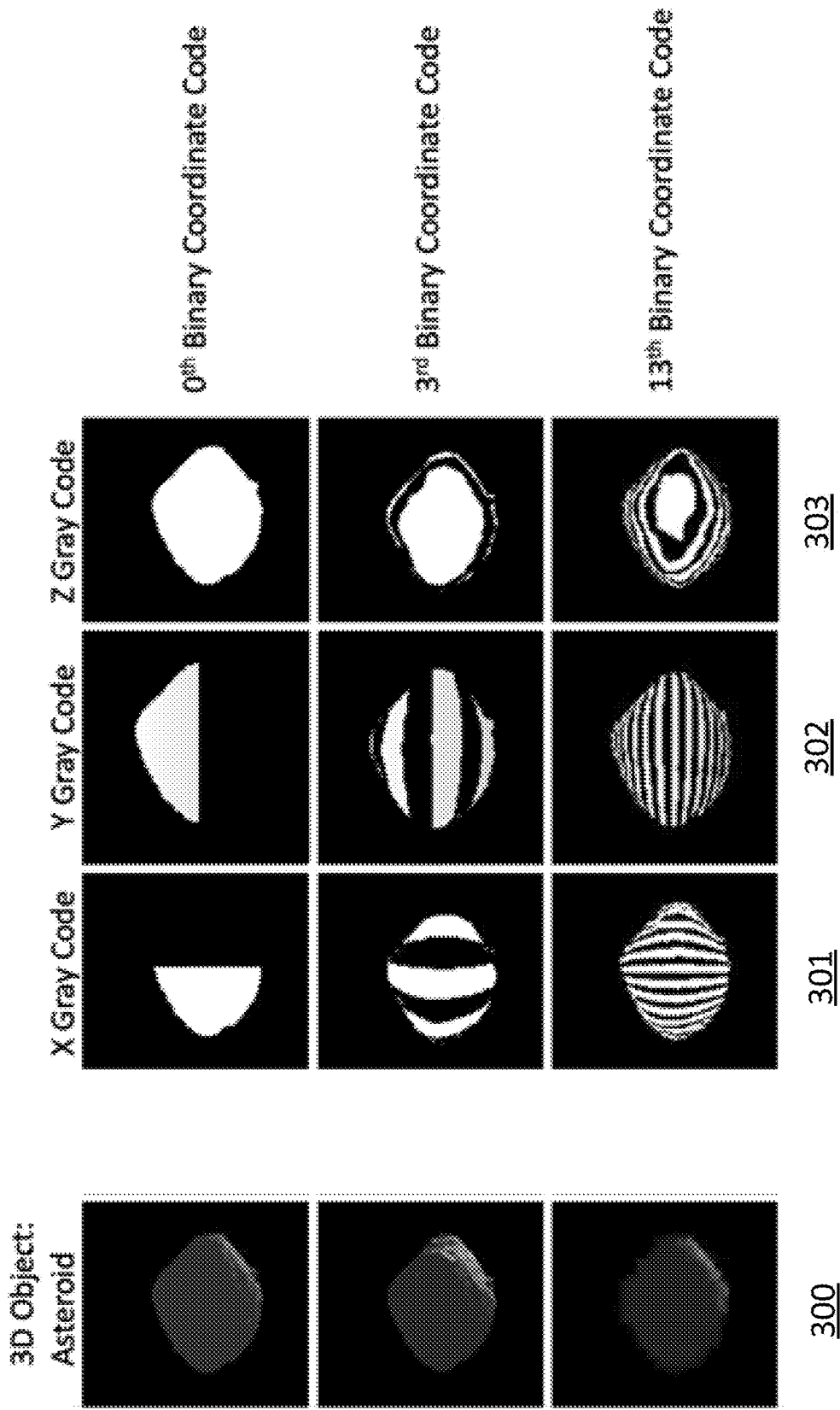
FIG. 3 illustrates an example of an encoding of a set of known object pixel coordinates in a three-dimensional frame of reference in accordance with specific embodiments of the invention disclosed herein.

FIG. 3 illustrates an example of an encoding of a set of known object pixel coordinates in a three-dimensional frame of reference in accordance with specific embodiments of the invention disclosed herein. In this specific example, the encoding uses 16-bit Gray code encodings though only the first, fourth, and fourteenth bits are illustrated. Column 300 illustrates the original image of the object which in this case is an asteroid. Column 301 illustrates the encoding for the x-coordinate in the three-dimensional frame of reference centered on the asteroid for each pixel in the original image. Column 302 illustrates the encoding for the y-coordinate in the three-dimensional frame of reference for each pixel in the original image. Column 303 illustrates the encoding for the z-coordinate in the three-dimensional frame of reference for each pixel in the original image. According to the encoding, each coordinate is represented by several values, in the illustrated case the first bit of the encoding for each pixel and for each dimension is shown in the first row, the $4^{th}$ bit of the same is shown in the second row, and the $14^{th}$ bit is shown in the third row. As illustrated, each channel is the same resolution as that of the input images. However, in specific embodiments they can be subsampled to a lower resolution. If the illustrated channels were the only training outputs of the network, there would be nine channels to train. However, since this example includes an encoding with 16-bit resolution the number of channels to train would be 16×3 (the number of channels is the number of values per coordinate multiplied by the number of dimensions). As each channel includes a number of entries equal to the number of pixels in the original input image, this can result in a large number of outputs for the loss function. As such, the output visibility map mentioned above can beneficially limit the number of values that need to be considered to a subset of pixels in which the object is actually present.

The example of FIG. 3 also presents a different way to conceptualize the training of a trained machine intelligence system in accordance with specific embodiments of the invention. As illustrated, each cartesian coordinate is first normalized to be coded, for example in 16 binary values each (0 to 65,536 potential coordinate values represented for each pixel). Each set of binary values of the pixels in the image can then be represented by a single black and white image. As a result, instead of using complex three-dimensional numerical x-y-z data to learn, the trained machine intelligence system can be trained using a set of black and white images which are instantiation of the channels mentioned above. In this example there would be 48 images resulting from the three dimensions of the frame of reference and the 16 binary values per coordinate. In specific implementations it is more effective to train a trained machine intelligence system using a black and white representation as compared to a numerical representation of three-dimensional coordinates.

In specific embodiments of the invention, training can be conducted in various ways and will depend on the characteristics of the trained machine intelligence system. For the avoidance of doubt, as used herein, the term trained machine intelligence system includes the system after it has been configured but is still resting in its default state (i.e., before training data has been applied). The training process generally involves collecting training data, inputting the training data to the trained machine intelligence system, and adjusting the characteristics of the trained machine intelligence system based on the output produced in response to the training data input. The adjustment step can include the use of matched output training data, which is associated with the input training data, to see if the output produced by the trained machine intelligence system matches the expected output. Training input data for which such output training data is available can be referred to as labeled training data.

In specific embodiments of the invention, the training data will be images of a known object labeled with ground truth information regarding whatever outputs the network is expected to produce in response to the image data. For example, the ground truth information could include unencoded known object coordinates for each pixel in the image or a subset of pixels, values for the visibility map for each pixel in the image, and values for encoded known object coordinate for each pixel in the image. The known object scan be any object or scene for which localization is being provided. The object can be an industrial part, a vehicle, a landmark, a spaceship, the moon, an agricultural field and its surroundings, an organ or tumor, etc. The images can be of the object from different camera poses with respect to the known object. The object can be partially occluded in the image or only be partially located within the image. The images can include the object at various positions and poses within the frame of the image.

In general, the training data will match the format of the data that the trained machine intelligence system will receive as inputs when it is deployed. For example, if the deployed system includes other data besides image data (e.g., the odometry data mentioned above) then the training data can include that data also. As another example, if the deployed system includes a visible light camera that will capture RGB images of the object, the training data can be RGB images of the object.

The training data can either be collected (e.g., using a camera capturing images of the known object) or it can be synthesized (e.g., using a CAD model of the known object). Synthesized training data can be referred to as synthetic data. If the training data is collected, the ground truth training output data can be captured also using additional sensors or knowledge of the relative positions of the device and object when the image was captured (e.g., using a rig to position the sensor at known locations or orientations relative to the device). Regardless of how the data is captured, the input training data can be modified with variances to improve the performance of the trained machine intelligence system. Additionally, the original capture and synthesis of the device can be conducted in a way that intentionally introduces variances. The variances can include variations in lighting, colors, adding atmosphere or weather effects, altering the surface materials of the object, dust effects, slight perturbations in the pose of the object relative to the camera, noise, and other distortions to assure that the trained machine intelligence system will operate regardless of errors in the sensors or changes in the conditions during operation of the system. The variances can also include moving the object off center in the image or modifying the level of zoom at which the object is perceived in the image. The training data can also be generated using variances produced by a model of the variances of the sensors that will be obtaining the input data when the trained machine intelligence system is deployed. In these embodiments, the trained machine intelligence system will incorporate through its training a set of images of the known object where the known object is presented with a sampling of the variances mentioned above (e.g., where the known object is off center in the image).

In specific embodiments of the invention, the training data can be collected or synthesized from a perspective in a zone of validity of the trained machine intelligence system. These embodiments can include a separate step of defining a zone of validity (e.g., a volume of validity in the case of a three-dimensional frame of reference) for navigating the device based on ex ante knowledge of where the device will generally be positioned with respect to the object when the trained machine intelligence system is deployed. In the case of a three-dimensional object, the training images can correspond to a 6-DOF sampling of poses in a defined volume where the defined volume defines a set of possible positions of the device relative to the object. Such zones of validity can simplify the operation of the trained machine intelligence system as it can mitigate the potential for symmetries to lead to ambiguities as to the true position of the device relative to the object. In these embodiments, the trained machine intelligence system will incorporate through its training a set of images of the known object from within the volume of validity.

The embodiments described in the prior paragraph can be beneficially applied in situations in which the device will need to be localized with respect to a limited portion of the frame of reference in which the known object coordinates will be generated. For example, in the case where the device is a space faring vessel and the known object includes a landing or docking surface for the vessel, the volume of validity could include a projected landing or docking approach for the space faring vessel. As another example, in the case where the device is a warehouse robot and the known object is a storage structure, the volume of validity could include the floor of a warehouse and extend to the height of the robot's sensors above the floor of the warehouse. As another example, in the case where the device is a tractor and the known object is a row of crops in a field, the zone of validity could include a surface of the field.

Figure 4:
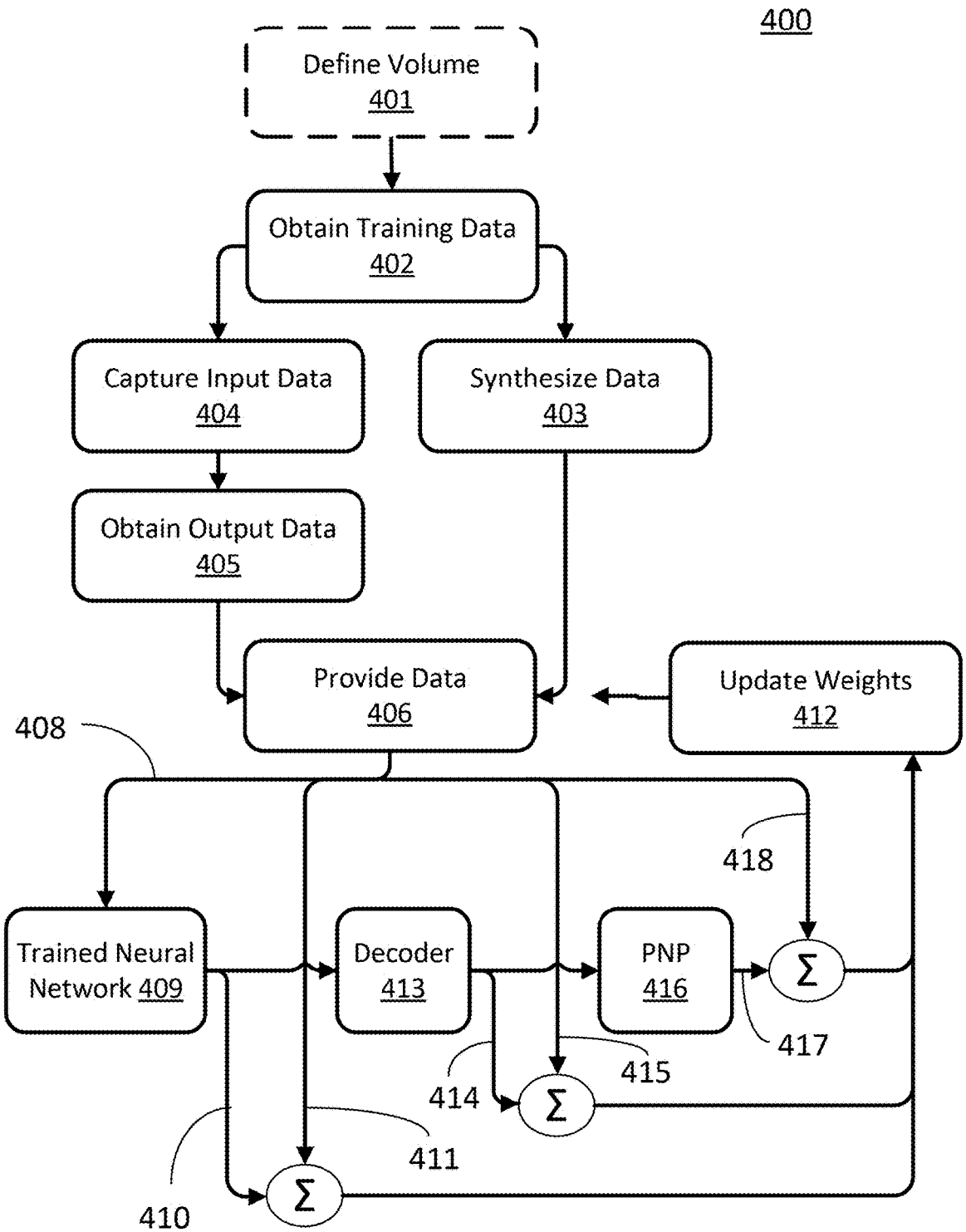
FIG. 4 illustrates a flow chart for a set of methods for training a machine intelligence system in accordance with specific embodiments of the invention disclosed herein.

FIG. 4 illustrates a flow chart 400 for a set of methods for training a machine intelligence system in accordance with specific embodiments of the invention disclosed herein. The combined steps of flow chart 400 constitute a process for training a trained machine intelligence system using a set of images of a known object. Flow chart 400 begins with an optional step of defining a zone of validity for navigating a device with respect to the object. Flow chart 400 then continues with a step of obtaining training data 402 which can include both or either branch that extends from step 402 in that the training data (e.g., both the input and output training data) can be synthesized in a step 403 and/or the input training data can be captured in a step 404 and the output training data can be obtained in a step 405. Steps 404 and 405 can be conducted simultaneously using multiple sensors or based on ex ante knowledge of the environment in which the data capture sensor is being used (e.g., if the sensor has been ex ante registered with the frame of reference of the object). Step 404 can be conducted using the same device that will be used during deployment or using a separate system. Step 405 can include human self-labeling methods to produce ground truth from the input data. The input data obtained in these steps can be similar to that which will be provided to the trained machine intelligence system when it is deployed. The output data can likewise be similar to the output data that will be generated by the trained machine intelligence system when it is deployed and can also include additional data such as intermittent training outputs of the machine intelligence system.

Flow chart 400 continues with a step 406 of providing the training data to the machine intelligence system. As illustrated, this can include a data reader feeding input training data 408 to a machine intelligence system. The input training data can include image data and can also include any of the additional data (e.g., depth data, odometry data, etc.) described above. In the illustrated case, the machine intelligence system includes a trained neural network 409. The trained neural network 409 outputs an encoding of a set of known object coordinates 410. The encoding of the set of known object coordinates 410 can be compared with an output training data 411 and a difference between the values can be used in a step 412 of updating the weights of neural network 409. The output training data 411 can be ground truth encoded known object coordinates for the pixels in the image in the input data 408. The set of known object coordinates 410 is provided to a decoder 413 which converts the encoded set of known object coordinates to unencoded known object coordinates 414. The unencoded set of known object coordinates 414 can be compared with output training data 415 and a difference between the values can be used in a step 412 of updating the weights of trained neural network 409. The output training data 415 can be ground truth known object coordinates for the pixels in the image in the input data 408. In specific embodiments in which decoder 413 is also a trained machine intelligence system, step 412 can also include updating the weights, or otherwise training, the decoder 413. The unencoded set of known object coordinates 414 is provided to a pnp solver system 416 to generate a localization 417 of a device. The localization 416 can be compared with output training data 417 and a difference between the values can be used in a step 412 of updating the weights of trained neural network 409 and possibly adjusting decoder 413 in embodiments in which decoder 413 is also trained. The output training data 417 can include a ground truth pose of the device. The step 412 can include the use of a loss function calculated using any of the values generated by the blocks in the diagram and variants thereof including the differences that are explicitly illustrated as being provided back to the step 412. This process can continue looping until a desired degree of accuracy is achieved by the overall localization pipeline which in the illustrated case includes the trained neural network 409, the decoder 413, and the pnp solver system 416.

Figure 5:
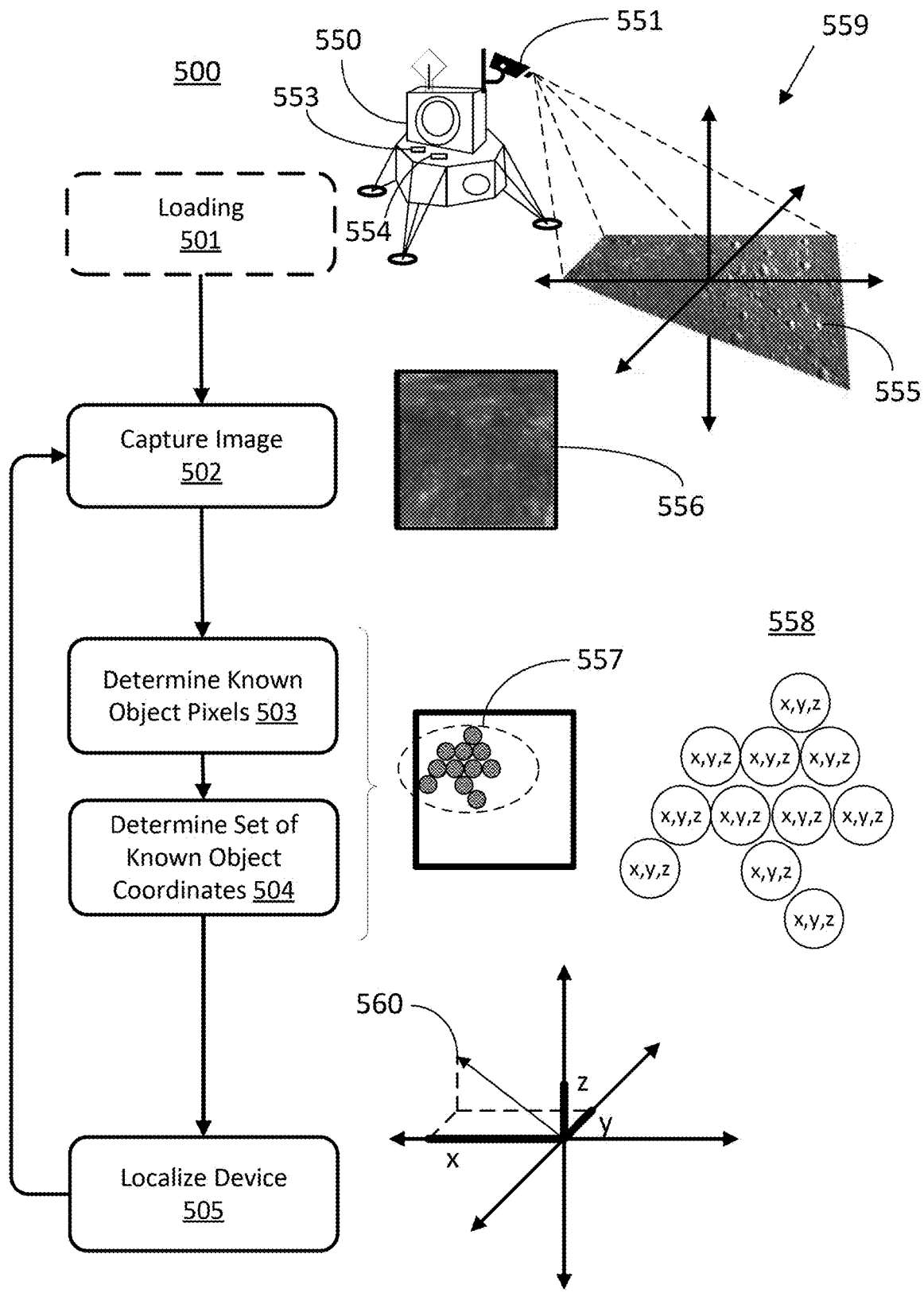
FIG. 5 illustrates a flow chart for a set of methods for localizing a device with respect to a known object using a trained machine intelligence system in accordance with specific embodiments of the invention disclosed herein.

FIG. 5 illustrates a flow chart 500 for a set of methods for localizing a device with respect to a known object in accordance with specific embodiments of the invention disclosed herein. Flow chart 500 begins with a step 501 of loading, into at least one computer-readable medium on a device 550 a set of instructions, which when executed by the at least one processor on the device, cause the system to execute the additional steps in flow chart 500. The step 501 can additionally include loading the trained machine intelligence system, such as the system trained using the methods in flow chart 400, into a computer readable medium on device 550. In the illustrated case, device 550 is a space faring vessel with an attached sensor 551 in the form of a visible light camera, at least one onboard computer readable medium 553, and a processor 554. The at least one computer-readable medium 553 can store both the instructions for the methods disclosed herein and the trained machine intelligence system. In the alternative, portions of the methods can be conducted using instructions stored and processors located at alternative locations with the product of those alternative instructions and the inputs thereto being exchanged with the device over a network.

Flow chart 500 continues with a step 502 of capturing, using a sensor attached to the device, an image of at least a portion of the known object, wherein the image includes a set of pixels. In the illustrated case, the sensor 551 is a visible light camera, the known object 555 is a landing site, and the image 556 is a two-dimensional array of pixels with associated greyscale pixel values. The sensor can have a known projection model (e.g., a pinhole model or focal length model) which can be used in a later step as part of the localization pipeline of the system. The sensor used in this step can be any of the sensors disclosed herein and the image can be captured along with additional data regarding device 550 or object 555 such as those disclosed herein. The image can be in grayscale, color, mono, stereo, or any of the variants disclosed elsewhere herein. The image can be captured along with a time series of images and such additional data. The collected data can then be presented to a trained machine intelligence system such as one stored in computer-readable medium 553.

Flow chart 500 continues with a step 503 and a step 504 which are addressed together because they can be conducted simultaneously by a trained machine intelligence system. Step 503 involves determining, using the image, a set of known object pixels from the set of pixels, wherein the known object occupies the set of known object pixels in the image. This step can be done as part of preprocessing the image for a trained machine intelligence system, by a separate trained machine intelligence system than the one used to conduct step 504, or using the same trained machine intelligence system used to conduct step 504. For example, step 503 can involve a trained machine intelligence system receiving image 556 and identifying set of known object pixels 557 which are pixels at which the known object 555 is located. Step 504 involves determining, using a trained machine intelligence system and the image, a set of known object coordinates for the set of known object pixels. For example, step 504 can involve a trained machine intelligence system receiving the set of known object pixels 557 from a separate system that conducted step 503, or simultaneously determining the set of known object coordinates and the set of known object pixels. In either case, the output can be a set of known object coordinates 558. The set of known object coordinates 558 can be in a frame of reference of the object 555. The set of known object coordinates 558 can encode each object coordinate in the set of known object coordinates using an encoding with at least two values per object coordinate. An example of such an encoding is discussed above with reference to FIGS. 1-3.

Flow chart 500 continues with a step 505 of determining, at least one of a location and an orientation of the device with respect to the known object, using the set of known object coordinates from the trained machine intelligence system. For example, step 505 could involve determining location 560 of device 550 with respect to known object 555 using the set of known object coordinates 558. This step could be conducted by a pnp solver system. These systems can convert an image of coordinate points for an object in an image and turn that into a pose relative to the object. For example, a set of known object coordinates and a probability of visibility map could be provided to the pnp system to conduct an algorithm (e.g., a RANdom SAmple Consensus (RANSAC) evaluation) to determine the location or orientation of the device with respect to the object. The RANSAC algorithm for pose can use random subsets of the known object coordinates and compute many candidate poses, each from a new random subset of known object coordinates. It can then find the best consensus pose and may optionally average the "n" best poses to find a more stable/accurate final pose.

Step 505 can be conducted in various ways to increase the performance of the localization pipeline. The known object coordinates can be used to localize the device in combination with a model of or other ex ante understanding of the object, in combination with a time series of images, in combination with a mask, or in combination with additional sensor data. These enhancements can be conducted in various ways to either enhance the accuracy or simplify the execution of step 505.

The process of step 505 can be simplified or the accuracy enhanced with the assistance of an ex ante understanding of the known object. A rigid body motion model or generalized CAD model of the object could be used to eliminate a large number of potential poses of the object as expressed by the captured known object coordinates. This could be done by a preprocessing system that would remove obvious outlier coordinates from consideration by the pnp system. As another example, regularization of the known object coordinates could be enforced using a model of the known object and force the known object coordinates to be closer to the model points of the object either by discarding outlier determined known object coordinates or by modifying the coordinates. Such processes could be iterated so that the known object coordinates begin to stabilize as locations on the known object as expected by the model.

Alternatively or in combination, the process of step 505 can be simplified or the accuracy enhanced using an analysis of a time series of past sensor data to simplify the determining of the pose of the object. For example, a time series of images can be used to improve and stabilize a predicted pose based on past estimations of the pose. For example, a Kalman filter could be used to make optimal predictions or smoothing for noisy data. In a related example, if the object were moving slowly compared to the sensor capture rate, the pose prediction could be averaged over time such that the pose was not allowed to wildly vary between frames.

Alternatively or in combination, the process of step 505 can be simplified or the accuracy enhanced using additional sensor data. For example, the pnp system could require the pose to be compatible with other data sources that serve as constraints on the possible poses of the known object such as IMU data, wheel odometry data, known ground plane orientations from magnetometers, gravimetric sensors, or gyroscopes, etc.

Alternatively or in combination, a mask can be used to focus the analysis of the pnp system on certain coordinates or portions of the image. For example, the probability of visibility map mentioned above can be used to eliminate coordinates from consideration by the pnp solver system. As another example, if the mask includes probabilities, that value can be taken into consideration by the pnp solver system (e.g., a RANSAC evaluation that favors high probability of visibility known object coordinates). The mask can also select only distinctive areas of the known object and ignore other pixels, or treat the coordinates associated with the other pixels as less accurate. The mask can also be used to remove spurious coordinates, to ignore coordinates associated with occluded portions of the object in the image, to ignore coordinates associated with portions of the image that may not or do not include portions of the object, or to enable the pnp system to know that it should not process a set of coordinates because the object is not located in the image such that effort is not wasted processing random input noise.

In specific embodiments of the invention, if there is not enough computer power to execute the pose determination algorithm on every frame, the above computations can be conducted less frequently, and the pose estimation can be fused with other sensors such as the IMU data and other data mentioned above and restrict the pose to variations over time at an expected pace in order to smooth out the object pose over time.

After the device has been localized, the process can continue with a loop back to step 502 to capture another image. This process can be iteratively conducted in real time either in lock step with a desired image collection rate for a given application, the capture rate of the sensor (e.g., frame rate of a camera), or with some other control system of the device (e.g., the period between acceptable inputs to a navigation system for the device). If the process is not being continuously conducted, the flow chart can terminate, and the localization pipeline system can hold for another input to begin.

The description provided above with respect to FIG. 5 did not explicitly include the concept of the known object coordinates being encoded. However, the execution of step 504 could include determining the encoded known object coordinates and the step 505 could include decoding the known object coordinates prior to providing them to a later stage in the localization pipeline (e.g., the pnp system mentioned above). As such, the determining of the at least one of a location and an orientation of the device in step 505 can include converting the encoding to a set of single value coordinates for the known object using a decoder. The decoder could be an analytical decoder or a machine intelligence decoder. In specific embodiments, the system will include both types of decoders and the outputs of the decoders and serve as intermediate training outputs of the machine intelligence system during training and can generate values that are both considered to reach a consensus as to the appropriate decoding when the trained machine intelligence system is deployed.

Figure 6:
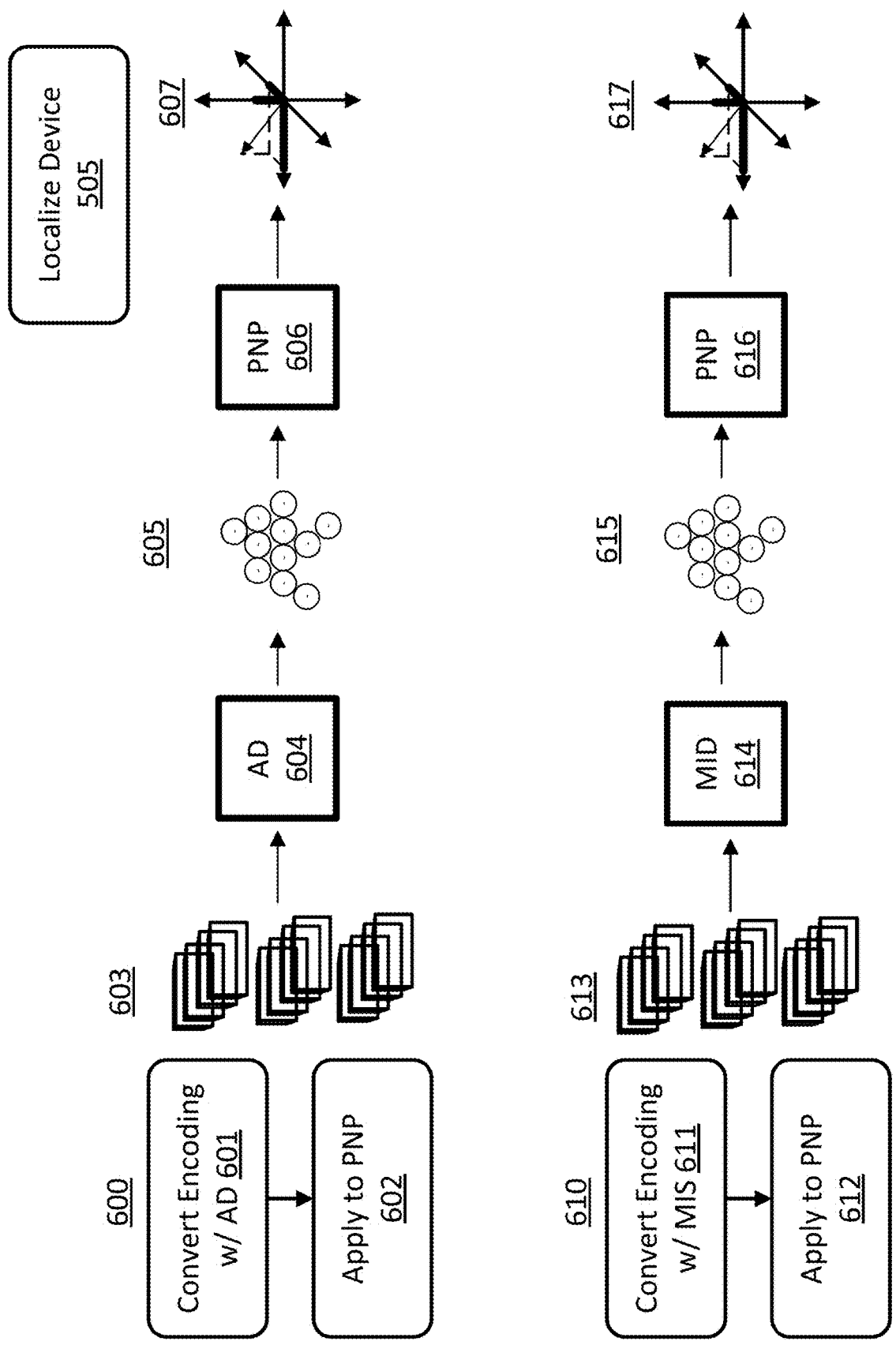
FIG. 6 illustrates two flow charts for a set of methods for determining at least one of a location and an orientation of a device with respect to a known object in accordance with specific embodiments of the invention disclosed herein.

FIG. 6 illustrates two flow charts for a set of methods for determining at least one of a location and an orientation of a device with respect to a known object in accordance with specific embodiments of the invention disclosed herein. The flow charts each independently represent a manner of implementing step 505 from FIG. 5. Flow chat 600 can be executed in localization pipelines that include an analytic decoder. Flow chart 610 can be executed in localization pipelines that include a trained machine intelligence decoder. In either case, the decoder is needed because it is being applied to embodiments in which the known object coordinates output by the trained machine intelligence system in step 504 are encoded. For example, they could be encoded using any of the encodings described above with respect to FIGS. 1-3 and elsewhere in this disclosure.

Flow chart 600 includes a step 601 of converting an encoding to a set of single value coordinates for the known object coordinates using an analytical decoder and a step 602 of applying the set of single value coordinates to a pnp solver system. The pnp solver can use any of the techniques mentioned above with respect to step 505. For example, an encoding in the form of a set of channels 603 could be provided to an analytic decoder 604 which translates them into a set of single value coordinates 605. Then the single value coordinates 605 can be applied to a pnp solver 606 which outputs a location or orientation of the device with respect to the object 607.

Flow chart 610 includes a step 611 of converting an encoding to a set of single value coordinates for the known object coordinates using a trained machine intelligence decoder and a step 612 of applying the set of single value coordinates to a pnp solver. The pnp solver can use any of the techniques mentioned above with respect to step 505. For example, an encoding in the form of a set of channels 613 could be provided to a trained machine intelligence decoder 614 which translates them into a set of single value coordinates 615. Then the single value coordinates 615 can be applied to a pnp solver 616 which outputs a location or orientation of the device with respect to the object 617. The trained machine intelligence decoder 614 can be trained at the same time as the trained machine intelligence system that generated the known object coordinates as in the example of FIG. 4. Alternatively, the trained machine intelligence decoder 614 can be trained separately.

There are numerous applications for various embodiments of the invention disclosed herein. For example, once the pose of the sensor is determined with respect to an object or scene, the pose can be passed down stream to a game system, an augmented reality system, a robotic system, a navigation system for carts or drones, a person or vehicle tracker, a landing or docking system for a spacecraft, or may be used in "assisted teleoperation" where a vehicle or robot can mostly travel or move (respectively) by itself taking the burden off a human operator who is in command of the vehicle or robot, but doesn't need to be much of the time. This allows one operator to potentially direct many vehicles or robots. For example, in assisted teleoperation, a farmer may direct several robots to the general start of rows in several fields. Once the robot gets there, it can notify the operator. The operator may then release the robot to start weeding a row of crops and the robot knows how to go down rows of plants without driving over them. It may then allow the operator to teleoperate, turning the robot around, or the robot may know how to turn around and do another row all by itself. This leaves an operator mostly free to conduct operations at a high level rather than to have to drive every vehicle or robot in detail. For example, in full autonomy, such a system can be used for autonomous driving. If we know where we are in a scene/map, then we can go from point A to B using a known map model of the scene (i.e., the area in which the car will drive becomes the "object" references in this disclosure). A different system could be in charge of recognizing bikes and other vehicles and avoiding them along the route, or the bikes and other vehicles could be treated as other "objects" for which relative localization information is provided to the navigation system of the car. As another example, once dense object coordinates are determined for an object, the resulting information can also enable other processing pipelines, such as stitching imagery or three-dimensional models of a larger object or scene together. Given that some of the trained machine intelligence systems disclosed herein can recognize the three-dimensional coordinates of an object or scene, they can also, for example, create a bird's eye view of the scene or a canonical view of the object. For example, a robot may see part of an object. The pose of the object can be established from that part of the object and the robot can then reason about how to grasp the object and lift it out of a tight area and insert it into another fixture or container. This is because the whole three-dimensional model and orientation of the object can be known from its parts.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within the device or a network accessible memory. These and other modifications and variations to the present invention may be practiced by those skilled in the art, without departing from the scope of the present invention, which is more particularly set forth in the appended claims.

What is claimed is:

1. A method for localizing a device with respect to a known object, comprising:
    capturing, using a sensor attached to the device, an image of at least a portion of the known object, wherein the image includes a set of pixels;
    determining, using the image, a set of known object pixels from the set of pixels, wherein the known object occupies the set of known object pixels in the image;
    determining, using a trained machine intelligence system and the image, a set of known object coordinates for the set of known object pixels, wherein the set of known object coordinates: (i) are in a frame of reference of the known object; and (ii) encode each known object coordinate in the set of known object coordinates using an encoding with at least two values per object coordinate; and
    determining, at least one of a location and an orientation of the device with respect to the known object, using the set of known object coordinates from the trained machine intelligence system.

2. The method of claim 1, wherein:
    the set of known object coordinates are intermediate training outputs of the trained machine intelligence system.

3. The method of claim 1, wherein:
    the encoding includes at least one set of channels;
    each channel in the at least one set of channels and the set of pixels are equal in size; and
    the at least two values per known object coordinate are each from different channels in the at least one set of channels.

4. The method of claim 1, wherein:
    the frame of reference of the object is at least one dimensional; and
    the set of known object coordinates includes at least one object coordinate per pixel in the set of known object pixels.

5. The method of claim 1, wherein:
    the image is an input to the trained machine intelligence system; and
    the set of known object pixels are determined using the trained machine intelligence system.

6. The method of claim 1, wherein the determining of the at least one of the location and the orientation of the device comprises:
    converting the encoding to a set of single value coordinates for the set of known object coordinates using an analytical decoder; and
    applying the set of single value coordinates to a perspective and point solver.

7. The method of claim 1, wherein the determining of the at least one of the location and the orientation of the device comprises:
    converting the encoding to a set of single value coordinates for the set of known object coordinates using a trained machine intelligence decoder; and
    applying the set of single value coordinates to a perspective and point solver.

8. The method of claim 1, wherein:
    each value in the encoding is binary.

9. The method of claim 1, wherein:
    the encoding is a Gray code encoding.

10. The method of claim 1, wherein:
    each value in the encoding is a floating-point number.

11. The method of claim 1, wherein:
    the trained machine intelligence system outputs a probability of known object visibility map for the set of known object pixels as part of the determining of the set of known object pixels;
    the probability of known object visibility provides a probability that the known object is visible in a pixel of the image for each pixel in the image; and
    training of the trained machine intelligence system is simplified using the probability of known object visibility map.

12. The method of claim 1, wherein:
    the trained machine intelligence system is a neural network;
    an input of the neural network is the image; and
    an output of the neural network is an encoding of the set of known object coordinates.

13. The method of claim 1, wherein:
    at least one of the known object coordinates in the set of known object coordinates corresponds with an occluded portion of the known object in the image.

14. The method of claim 1, wherein:
    the trained machine intelligence system incorporates through its training a set of images of the known object where the known object is off center.

15. The method of claim 1, further comprising:
    defining a zone of validity for navigating the device;
    wherein the trained machine intelligence system incorporates through its training a set of images of the known object from within the zone of validity.

16. The method of claim 15, wherein:
    the device is a space faring vessel;
    the known object includes a landing or docking surface for the space faring vessel; and
    the zone of validity includes a projected landing or docking approach for the space faring vessel.

17. The method of claim 15, wherein:
    the device is a warehouse robot;
    the known object is a storage structure; and
    the zone of validity includes a floor of a warehouse.

18. The method of claim 15, wherein:
    the device is a tractor;
    the known object is a row of crops in a field; and
    the zone of validity includes a surface of the field.

19. A device comprising:
a sensor attached to the device;
at least one processor; and
at least one non-transitory computer-readable medium storing a set of instructions which, when executed by the at least one processor, assist in localizing the device with respect to a known object, by:
capturing, using the sensor, an image of at least a portion of the known object, wherein the image includes a set of pixels;
determining, using the image, a set of known object pixels from the set of pixels, wherein the known object occupies the set of known object pixels in the image;
determining, using a trained machine intelligence system and the image, a set of known object coordinates for the set of known object pixels, wherein the set of known object coordinates: (i) are in a frame of reference of the known object; and (ii) encode each known object coordinate in the set of known object coordinates using an encoding with at least two values per object coordinate; and
determining, at least one of a location and an orientation of the device with respect to the known object, using the set of known object coordinates from the trained machine intelligence system.

20. The device of claim 19, wherein:
the set of known object coordinates are intermediate training outputs of the trained machine intelligence system.

21. The device of claim 19, wherein:
the encoding includes at least one set of channels;
each channel in the at least one set of channels and the set of pixels are equal in size; and
the at least two values per known object coordinate are each from different channels in the at least one set of channels.

22. The device of claim 19, wherein:
the frame of reference of the object is at least one dimensional; and
the set of known object coordinates includes at least one object coordinate per pixel in the set of known object pixels.

23. The device of claim 19, wherein:
the image is an input to the trained machine intelligence system; and
the set of known object pixels are determined using the trained machine intelligence system.

24. The device of claim 19, wherein the determining of the at least one of the location and the orientation of the device comprises:
converting the encoding to a set of single value coordinates for the set of known object coordinates using an analytical decoder; and
applying the set of single value coordinates to a perspective and point solver.

25. The device of claim 19, wherein the determining of the at least one of the location and the orientation of the device comprises:
converting the encoding to a set of single value coordinates for the set of known object coordinates using a trained machine intelligence decoder; and
applying the set of single value coordinates to a perspective and point solver.

26. The device of claim 19, wherein:
each value in the encoding is binary.

27. The device of claim 19, wherein:
the encoding is a Gray code encoding.

28. The device of claim 19, wherein:
each value in the encoding is a floating-point number.

29. The device of claim 19, wherein:
the trained machine intelligence system outputs a probability of known object visibility map for the set of known object pixels as part of the determining of the set of known object pixels;
the probability of known object visibility provides a probability that the known object is visible in a pixel of the image for each pixel in the image; and
training of the trained machine intelligence system is simplified using the probability of known object visibility map.

30. A method for deploying a device localization system on a device comprising:
training a trained machine intelligence system using a set of images of a known object; and
loading, into at least one non-transitory computer-readable medium on the device a set of instructions which, when executed by at least one processor on the device, assist in localizing the device with respect to a known object, by:
capturing, using a sensor attached to the device, an image of at least a portion of the known object, wherein the image includes a set of pixels;
determining, using the image, a set of known object pixels from the set of pixels, wherein the known object occupies the set of known object pixels in the image;
determining, using a trained machine intelligence system and the image, a set of known object coordinates for the set of known object pixels, wherein the set of known object coordinates: (i) are in a frame of reference of the known object; and (ii) encode each known object coordinate in the set of known object coordinates using an encoding with at least two values per object coordinate; and
determining, at least one of a location and an orientation of the device with respect to the known object, using the set of known object coordinates from the trained machine intelligence system.

* * * * *